(12) United States Patent
Love et al.

(10) Patent No.: US 9,716,708 B2
(45) Date of Patent: Jul. 25, 2017

(54) SECURITY CERTIFICATES FOR SYSTEM-ON-CHIP SECURITY

(71) Applicant: Microsoft Corporation, Redmond, WA (US)

(72) Inventors: Michael Love, Union City, CA (US); Ling Tony Chen, Bellevue, WA (US); Felix Domke, Luebeck (DE); Kenneth Ray, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/026,804

(22) Filed: Sep. 13, 2013

(65) Prior Publication Data

US 2015/0082420 A1    Mar. 19, 2015

(51) Int. Cl.
| | |
|---|---|
| *G06F 21/00* | (2013.01) |
| *H04L 29/06* | (2006.01) |
| *G06F 21/62* | (2013.01) |
| *G06F 21/71* | (2013.01) |
| *G06F 21/72* | (2013.01) |

(52) U.S. Cl.
CPC ...... *H04L 63/0823* (2013.01); *G06F 21/6218* (2013.01); *G06F 21/71* (2013.01); *G06F 21/72* (2013.01); *G06F 2221/2151* (2013.01); *H04L 63/0876* (2013.01)

(58) Field of Classification Search
CPC . H04L 9/3252; H04L 9/0838; H04L 63/0823; H04L 63/0876; G06F 12/1416; G06F 21/78; G06F 21/10; G06F 21/6218; G06F 21/71; G06F 21/72; G06F 2221/2151

USPC .......................................................... 726/16
See application file for complete search history.

(56) References Cited

U.S. PATENT DOCUMENTS

| | | | |
|---|---|---|---|
| 6,980,239 | B1 | 12/2005 | Motta |
| 7,310,721 | B2 | 12/2007 | Cohen |
| 7,742,597 | B2 | 6/2010 | Lewis |
| 7,822,993 | B2 | 10/2010 | Morais et al. |
| 8,037,437 | B2 | 10/2011 | Davis et al. |

(Continued)

OTHER PUBLICATIONS

"Discretix Secure Debug Module (DxSDM)", Published on: Jan. 24, 2012, Available at: http://www.discretix.com/Products-Solutions/Secure-Debug.html.

(Continued)

*Primary Examiner* — John B King
*Assistant Examiner* — Narciso Victoria
(74) *Attorney, Agent, or Firm* — Vierra Magen Marcus LLP

(57) ABSTRACT

A system-on-chip (SoC) includes multiple hardware modules that are implemented on a substrate. The hardware modules include a plurality of hardware and software security features and the SoC provides one or more external interfaces for accessing the security features. A validation module, implemented in the boot code of the SoC for example, manages security certificates to control access to the plurality of security features. Each security certificate includes one or more unique identifiers corresponding to one or more hardware modules in the SoC and access control settings for one or more security features of the one or more hardware modules. The security certificate additionally includes a certificate signature signed by a secure key.

20 Claims, 8 Drawing Sheets

(56) References Cited

U.S. PATENT DOCUMENTS

| | | |
|---|---|---|
| 8,195,914 B2 | 6/2012 | Hall et al. |
| 8,255,578 B2 | 8/2012 | Maietta |
| 8,255,700 B2 | 8/2012 | Kitariev et al. |
| 8,285,980 B1 | 10/2012 | Feng et al. |
| 2004/0025010 A1 | 2/2004 | Azema et al. |
| 2004/0025011 A1* | 2/2004 | Azema et al. ............ 713/156 |
| 2007/0209072 A1 | 9/2007 | Chen |
| 2008/0148343 A1 | 6/2008 | Taniguchi |
| 2008/0263362 A1 | 10/2008 | Chen |
| 2008/0282087 A1 | 11/2008 | Stollon et al. |
| 2008/0294838 A1* | 11/2008 | Houston ............ G06F 9/4403 711/103 |
| 2009/0296933 A1 | 12/2009 | Akselrod et al. |
| 2010/0005314 A1 | 1/2010 | Johnson et al. |
| 2011/0066835 A1 | 3/2011 | Kothari et al. |
| 2012/0082171 A1 | 4/2012 | Georgiou et al. |
| 2012/0137119 A1 | 5/2012 | Doerr et al. |
| 2013/0086385 A1* | 4/2013 | Poeluev .................. 713/176 |
| 2013/0205139 A1 | 8/2013 | Walrath |
| 2013/0212382 A1* | 8/2013 | Etchegoyen et al. ........ 713/156 |
| 2013/0290286 A1 | 10/2013 | Su et al. |
| 2014/0108825 A1* | 4/2014 | O'Loughlin et al. ........ 713/193 |
| 2014/0359755 A1 | 12/2014 | Beitel |
| 2015/0095661 A1 | 4/2015 | Sell et al. |

OTHER PUBLICATIONS

Akselrod, et al., "Platform Independent Debug Port Controller Architecture with Security", In Proceedings of Design, Automation and Test in Europe, Mar. 10, 2006, 6 pages.

U.S. Appl. No. 14/013,561, filed Aug. 29, 2013.

Altmark, Alan, "Understanding z/VM Integrity and Security," Published on: Nov. 2002, Available at: http://www.ibmsystemsmag.com/mainframe/administrator/security/Understanding-z-VM-Integrity0and-Security/?page=2.

Li, et al., "Secure Virtual Machine Execution under an Untrusted Management OS," In IEEE 3rd International Conference on Cloud Computing, Jul. 5, 2010, 8 pages.

Suh, et al., "Efficient Memory Integrity Verification and Encryption for Secure Processors," In Proceedings of the 36th Annual International Symposium on Microarchitecture, Dec. 2003, 15 pages.

"Security Model for the Next-Generation Secure Computing Base," Published on: Feb. 6, 2004, Available at: http://www.microsoft.com/resources/ngscb/documents/NGSCB_Security_Model.doc.

Fujiyama, Hiroyuki, "System-on-a-Chip with Security Modules for Network Home Electric Appliances," Fujitsu Sci. Tech. J., vol. 42, No. 2, Apr. 2006, pp. 227-233.

* cited by examiner

| AEB Table | | | | |
|---|---|---|---|---|
| Output | State 1 | State 2 | REV_SEL | OTP |
| Clock | HWNO | HWYES | 0 | 1 |
| Reset | HWYES | Y/SPWL | 0 | 1 |
| Debug | HWNO | Y/SPWL | 0 | 0 |
| I/O Pads | HWNO | N/SPWL | 0 | 0 |
| Bus Interface | HWNO | N/SPWL | 0 | 0 |
| DFT | HWNO | N/SPWL | 0 | 1 |
| Test Circuit | HWYES | Y/SPWL | 1 | 0 |

*FIG. 6*

SECURITY CERTIFICATES FOR SYSTEM-ON-CHIP SECURITY

BACKGROUND

The disclosed technology is related to system-on-chip security.

A system-on-chip (SoC) integrates the components of an electronic system such as a computer into a single integrated circuit or chip. It may contain digital, analog, mixed-signal, and radio-frequency functions. A typical SoC can include a microcontroller, microprocessor or digital signal processor (DSP) cores. Some SoCs, referred to as multiprocessor System-on-Chip (MPSoC), include more than one processor core. Other components include memory blocks such as ROM, RAM, EEPROM and Flash, timing sources including oscillators and phase-locked loops, peripherals including counter-timers, real-time timers and power-on reset generators, external interfaces including industry standards such as USB, FireWire, Ethernet, USART, SPI, analog interfaces such as analog-to-digital converters (ADCs) and digital-to-analog converters (DACs), and voltage regulators and power management circuits. Example applications for SoC include music players and video game consoles, among many other possible applications.

SoC's often expose interfaces to security features that allow developers and manufacturers of the devices to test and/or evaluate the devices. These interfaces are typically exposed as one or more pins that can be accessed by the developers or manufacturers of the devices, but can be interfaced in other manners. Although these interfaces are useful to the developers or manufacturers of the SoC's, they can also be a point of vulnerability for a system. For example, malicious users can attempt to use these interfaces to obtain access to internal components of the system and obtain access to data or information to which they were not intended to have access.

SUMMARY

A system-on-chip (SoC) is provided that includes a validation module to manage security certificates associated with security features provided by the various hardware modules of the SoC as well as software features of the SoC. Hardware identifiers for hardware modules are programmed into memory for the SoC and one or more keys are hard-coded in the SoC to manage access to the security certificates. A security certificate identifies one or more hardware modules within a SoC using hardware identifiers, and includes access control settings for one or more security features provided by the hardware module(s). Security certificates may also identify and include access control settings for software security features, such as by setting a software state in a secure manner. Access control settings may enable, disable, lock or perform other controls for a security setting. The security certificate includes a certificate signature that is verified using the key of the SoC. If the security certificate is verified and contains a hardware identifier for a hardware module of the SoC, the validation module executes the access control setting(s) in the security certificate.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a block diagram depicting an access enablement table in accordance with one embodiment.

DETAILED DESCRIPTION

Figure 1:
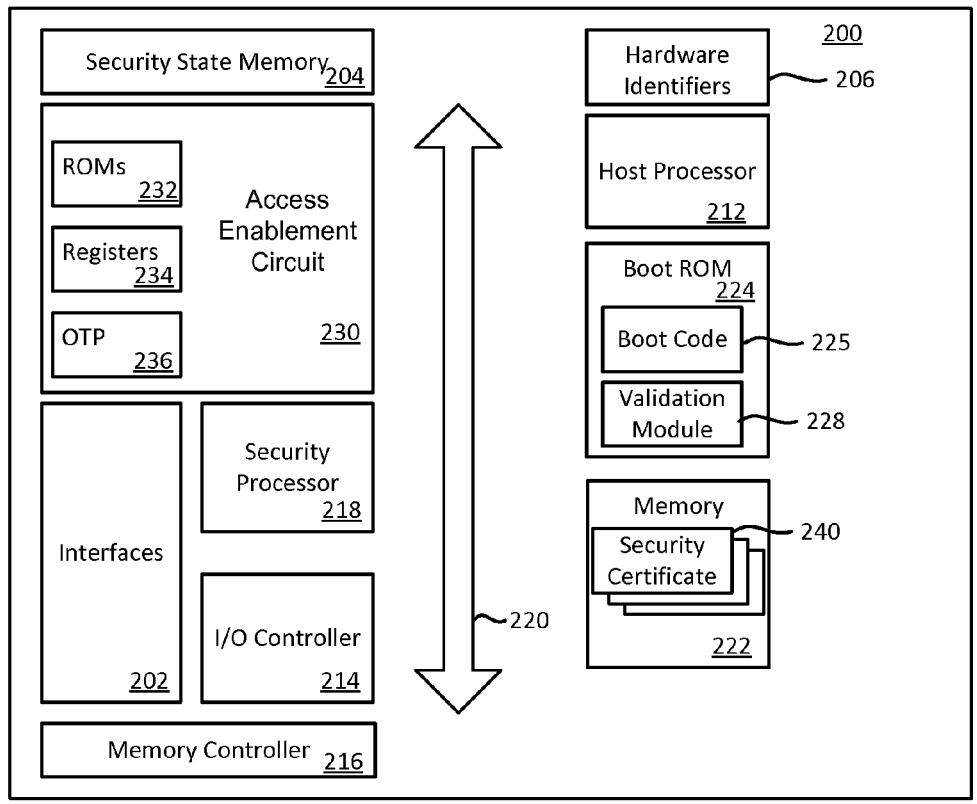
FIG. 1 is a block diagram depicting a system-on-chip (SOC) including a validation module for managing security certificates.

Systems-on-chip (SoC's) and related techniques for designing and manufacturing SoC's are provided. A SoC includes multiple hardware modules that are implemented on a substrate. The hardware modules include a plurality of security features and the SoC typically provides one or more external interfaces for accessing the security features. A SoC typically provides many software-related security features as well. The security features may include test, debug, and/or evaluation features for example. A validation module, implemented in the boot code of the SoC for example, manages security certificates to control access to the plurality of security features. Each security certificate includes one or more unique identifiers corresponding to one or more hardware modules in the SoC and access control settings for one or more security features of the one or more hardware modules. The security certificate additionally includes a certificate signature signed by a secure key.

The validation module verifies any security certificates contained in the SoC, during boot of the SoC or at other times as described. The validation module uses one or more keys that are hard coded into the boot code of the SoC to verify the security certificates. If a security certificate is verified, the validation module accesses a signed digest value in the security certificate and compares it to a digest value calculated for the information in the security certificate. If the values match, the validation module compares the one or more unique identifiers in the security certificate with a list of hardware identifiers for the hardware modules of the SoC. The hardware identifiers are hard coded into the SoC, for example by irreversibly programming one-time programmable (OTP) memory such as OTP fuses. If a unique identifier in the certificate matches a hardware identifier on the SoC, the validation module processes the access control settings set forth in the security certificate for the hardware module. For example, the validation module may enable or disable a security feature for a current boot cycle. The validation module may also set a security feature to a default setting and allow software programmability and/or locking of the security feature for a current boot cycle. In one example, the security certificates include expiration times. The validation module compares a time from a secure source with the expiration time so that certificates may be operable for limited periods of time. The security features may include hardware-related security features and software-related security features.

In one embodiment, a centralized access enablement circuit controls access to a subset of the plurality of security features, such as test, debug, and/or evaluation interfaces provided by the different modules of the system. The access enablement circuit provides a central location and design point for managing the various security features provided by the SoC. In this manner, the access enablement circuit provides a central location for enabling and disabling hardware within the system to control security features.

A SoC in one embodiment defines different security states, providing irreversible progression through the security states as the chip is manufactured. The access enablement circuit for a SoC implementing different security states provides individual access control settings for the different security states. In this manner, each security feature can have an individual control setting for the different security states, allowing select features to be enabled for a given security state. One-time programmable memory and register controls are provided in one embodiment that allow different access control settings for an individual security feature. In one embodiment, security certificates can provide security-state specific control of one or more security features. A security certificate may only be valid for a particular security state or may be valid for multiple security states and provide different access control settings for different security states.

FIG. 1 illustrates an example of a system-on-chip (SoC) 200 that uses security certificates to manage access control settings for hardware modules of the SoC. SoC 200 includes one or more interfaces 202 that expose debug, DFT, test, validation, characterization and/or evaluation features within the SoC. Collectively, these features and software security features are referred to as security features. Interfaces 202 may include one or more pins used as a port or that otherwise permit external communication with SoC 200. By way of non-limiting example, interfaces 202 may expose security features such DFT JTAG tap controllers, DFT P1500 Tap controllers, DFT test features such as scan dump, memory dump, memory BIST, JTAG SW debuggers for embedded processors, JTAG bridges to on-chip busses, on-chip debug bus logic, security fences, voltage glitch detection circuits/level monitors, clock glitch detection circuits/level monitors, temperature monitors, input/output (I/O) signal glitch catcher circuits, digital and analog debug busses, digital and analog test busses, bypass, clock enables, PLL test circuits, general purpose I/O's, on-chip clock stop circuitry, clock controls, reset controls, test busses, input/output (I/O) pads, DFT features, or any other security components for which access is to be controlled. Security features may include hardware or software security features provided by hardware modules of the SoC.

System on chip 200 includes a host processor 212, an input/output (I/O) controller 214, a memory controller 216, and a security processor 218 that can communicate with one another via a bus 220. The system bus 220 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus, and the Advanced Microcontroller Bus Architecture (AMBA) bus. DMA controllers which route data directly between external interfaces and memory, bypassing the processor core and thereby increasing the data throughput of the SoC can also be used. Although particular components are illustrated in FIG. 1, it is to be appreciated that additional or fewer components can be included in system-on-chip 200. For example, additional controllers or processors such as graphics processing units can be included, cache memories can be included, multiple security processors 218 can be included, and so forth. In one embodiment, a stand-alone security processor 218 is not included in SoC 200. For example, security processing may be provided by host processor 212.

Memory controller 216 controls access to and operations for memory 222. Memory 222 can include volatile media (such as random access memory (RAM)) and/or nonvolatile media (such as read only memory (ROM), Flash memory, and so forth). Although a single memory 222 is shown, SoC's may include multiple memories of the same or different types. Memory controller 216 allows different components of system-on-chip 200, such as host processor 212 and security processor 218, to write to and/or read from memory 222. Data and/or instructions can be read from and/or written to memory 222, such as instructions of a program to be executed by security processor 218 or host processor 212, data for a program being executed by security processor 218 or host processor 212, and so forth. Host processor 212 executes one or more programs that provide various functionality of device 200, such as audio and/or video recording and/or playback, gaming and/or other recreational functions, and so forth.

I/O controller 214 allows one or more external components or devices to communicate with components or modules of system-on-chip 200. I/O controller 214 operates in a conventional manner to identify signals received via the pins or other connection mechanism of external interfaces 202, and to detect signal values based on the identified signals. These signals can be, for example, changes in voltage levels that indicate digital values of 0 or digital values of 1. In response to detecting a signal value on a pin or other connection mechanism of external interfaces 202, I/O controller 214 provides the detected signal value to another component of system-on-chip 200, typically host processor 212 or security processor 218.

Security processor 218 executes one or more programs that provide security functionality for system on chip 200. This security functionality can include, for example, encryption and/or decryption of data, verifying digital signatures of instructions (e.g., programs or modules) that are included in memory 222 so that only verified instructions are executed by security processor 218 and/or host processor 212, and so forth.

Access enablement circuit (AEC) 230 is a centralized circuit that controls access to the individual security features of SoC 200, for example, as may be exposed over interfaces 202. AEC 230 provides individual control of each security specific feature of SoC 200 from a centralized location. In one example, the AEC 230 controls each security feature as always enabled, always disabled, programmable by security processor 218 or other component, with default on or off, and lockable. The AEC 230 may also control the feature using a complex function based on inputs for the security feature. A lockable security feature is one where the security processor 218 or other component can enable or disable the feature, but then cannot further modify the feature for a current power cycle of the part. In one example, AEC 230 provides and controls an output for controlling each security feature of the SoC 200. Each output can include a wire or subset of wires in the circuit that control a particular security feature. With a subset or multiple wire implementation in one embodiment, logic may be used at the destination to determine the state of enablement. In some embodiment, the SoC includes security features not controlled by the AEC.

A set of security states for SoC 200 are defined in security state memory 204 to enable different security feature sets for a part at different times. Security state memory is typically a one-time-programmable memory including fuses or antifuses, for example. The set of security states and a predefined progression through them can be defined by blowing or otherwise programming the programmable fuses as the part undergoes manufacturing, testing, and then is provided to an end-user. One embodiment provides a set of security states with each security state having a particular set of behaviors defined for the set of security features. For each security state, the individual security features may be enabled, disabled, have a default setting with software programmability, and/or the ability to be locked. In this manner, each security state may be defined with a different set of available security features. In one embodiment, the security states have a defined irreversible progression as the part is manufactured. For example, the part may have an initial or blank state defined for its manufacturing phase. In this blank state, the access enablement circuitry may generally provide access to many of the security features. In other examples, the initial blank state may disable many security features, for example, to prevent exposures to security states being glitched to a blank state with voltage attacks and thereby exposing security features. The AEC 230 and/or security processor may also limit access to various functional elements at this stage. After manufacturing, the fuses may be programmed to a different encoding defining a test security state. In the test security state, for example, the AEC 230 may generally provide access to most security features and functional features. Before shipping the SoC 200 to an end-user, an operational security state may be programmed into the fuses. In this state, most security features may be disabled while most or all functional elements are enabled. As noted above and described hereinafter, software programmability and other techniques may be used to control the behavior for a security feature, rather than only defining an enabled or disabled condition.

Access enablement circuit 230 includes or accesses ROM's 232 in one embodiment to further control individual security features. For example, the AEC 230 may define a default access control for a security feature using a first ROM and define the influence of software on the security feature using a second ROM. In other examples, other memories can be used to define access control settings and software influences. For example, programmable fuses or SRAM loaded from a software table may be used. AEC 230 additionally includes or accesses a set of data registers 234 in one embodiment. The data registers can be modified by software and/or the security processor 218 in one embodiment to enable, disable, and/or lock a corresponding security feature. The AEC may read the set of data registers to determine an access control setting for a security feature. Finally, AEC 230 includes or accesses a set of one-time programmable fuses 236 in one embodiment that provide additional control over security features. For example, in a particular security state, the OTP fuses may permit the same security feature to have a different behavior based on the OTP bits. In this manner, the OTP fuses can be programmed after manufacture to alter the access control setting for a security feature. As described hereinafter, security certificates may be used to enable or disable access to software programmability of the data registers.

Boot code 225 is typically implemented in Boot ROM 224 that is integrated in the silicon of the SoC. The boot code 225 controls a boot sequence and the source of boot programs for the SoC. Boot programs may be sourced directly from Boot ROM 224 or from other sources such as flash memory or over interfaces 202 provided by the SoC, such as SPI in one example.

Boot code 225 executes a validation module 228 to manage security certificates 240 for accessing the security features provided by the various hardware modules of SoC 200. Security certificates may be delivered to the SoC over a network connection, from a trusted certificate provider for example, or over JTAG or other mechanisms. In one embodiment, the validation module verifies security certificates 240 on initial boot of the SoC, but as described, security certificates may be used to execute access control settings at other times as well. Validation module 228 uses a list of hardware identifiers 206 to verify security certificates 240. In this manner, security certificates 240 may be tied to particular SoC's, and more granularly, to particular hardware modules within a SoC. A security certificate may identify one or more hardware modules by its hardware identifier so that the certificate is only applied to the identified module(s).

Figure 2:
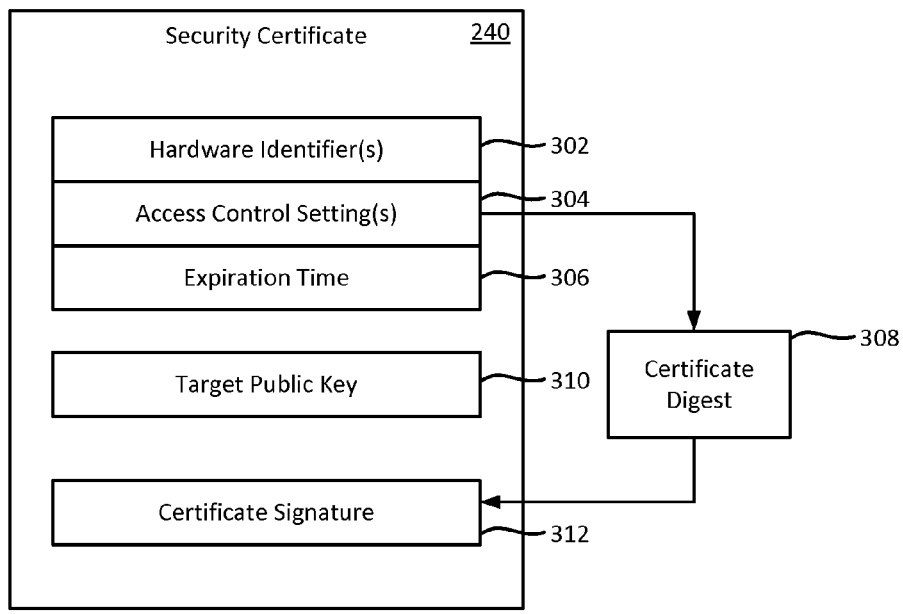
FIG. 2 is a block diagram depicting a security certificate.

FIG. 2 is a block diagram depicting details of a security certificate 240 in accordance with one embodiment. Security certificate 240 includes a set of one or more hardware identifiers 302 identifying a hardware module within one or more SoC's to which the security certificate applies. Security certificate 300 further includes a list of one or more access control settings 304 for the set of hardware ids. Each access control setting 304 corresponds to a security feature provided by the hardware module corresponding to a hardware id in the set. Various access control settings can be used in accordance with different implementations. For example, an access control setting may specify that a security feature that is currently disabled be enabled for a current boot cycle or that a currently enabled security feature be disabled for a current boot cycle. An access control setting may also specify a default setting for the feature and the ability for software or other modules to enable a default disabled feature or to disable a default enabled security certificate. Software may be enabled to disable or enable a security feature. Moreover, the access control setting may permit software to lock a security feature as enabled or disabled for a current boot cycle. Additionally, the access controls setting may permit software to make one-time changes to the security feature setting. For example, the access control setting may permit software to enable a security feature once, and disable a security feature once, without permitting further changes to the security feature. Other combinations of one-time actions can be used as well as other general access control settings.

The security certificate includes an optional expiration time 306 for the certificate. In this manner, security feature functionality can be granted for limited periods of time. The validation module can compare a current time from a trusted source to the expiration time as part of the certificate verification process. The security certificate also includes one or more keys 310 in one embodiment, corresponding to the target SoC for the security certificate.

The security certificate includes a certificate signature 312 generated using a cryptographic key, for example held by a trusted certificate provider or authority. A digest value is created from the content of the security certificate, including the set of unique identifiers, the access control settings and the expiration time. The signature operation is performed on the digest value 308 calculated from the information included in the security certificate to generate certificate signature 312. It is noted that public/private key pairs can be used as well as other key arrangements. For example, keys 310 are public keys and the certificate signatures are generated using a private key in one embodiment. In one embodiment, security certificates may be self-signed. For example, a key available when executing secure code on the SoC may be used, with a symmetric HMAC for example.

Figure 3:
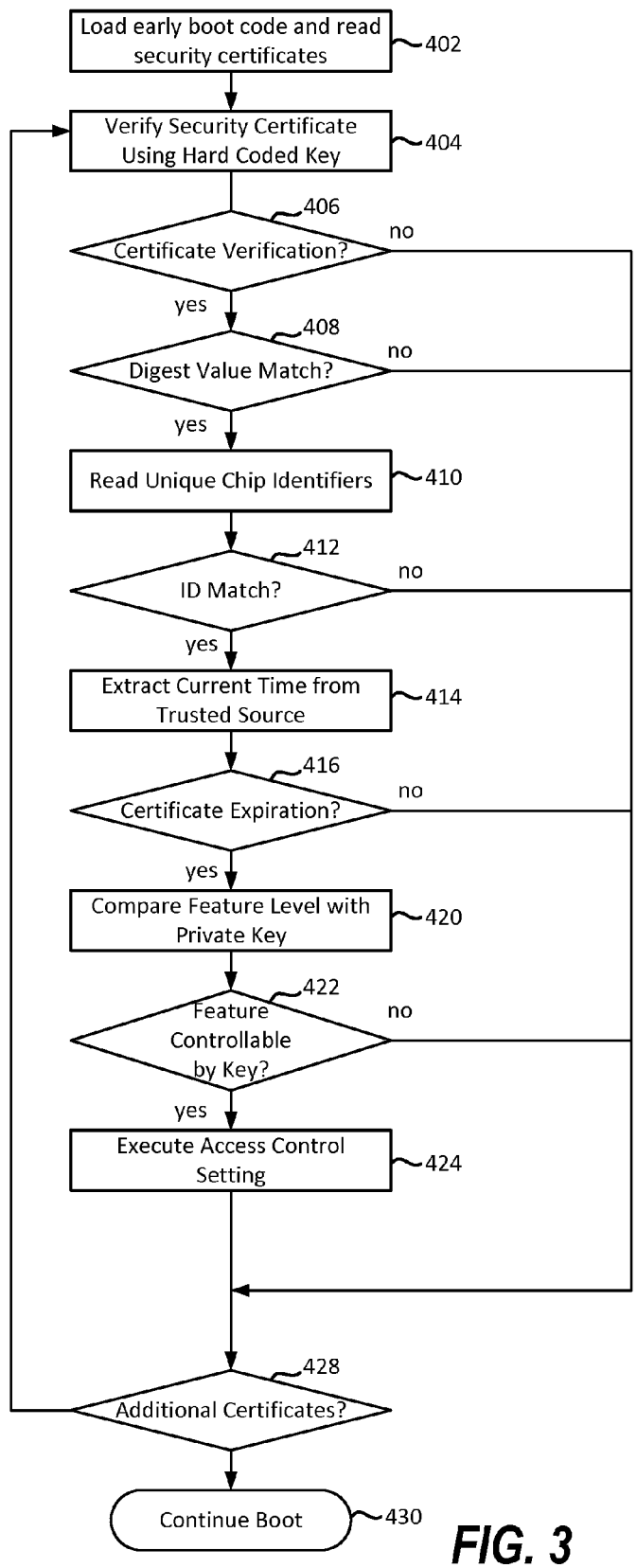
FIG. 3 is a flowchart describing a process for using security certificates to control access to security features of a SoC.

FIG. 3 is a flowchart describing a process including operation by validation module 228 to utilize security certificates 240 for controlling access to security features of a SoC. At step 402, the SoC loads early boot code. The early boot code executes a validation module which reads any available security certificates for the SoC. In one embodiment, the host processor 212 executes the early boot code from silicon or Boot ROM 224, for example.

At step 404, the validation module selects a first security certificate and applies a cryptographic function using a key hard coded within boot code 225. The key is used to verify the authenticity of the certificate signature. If the signature is authenticated at step 406, the validation module determines whether a digest value signed in the security certificate matches a digest value calculated by the validation module from the content of the certificate at step 408. The validation module may apply a hash algorithm to the contents of the decoded certificate and determine whether the hash value matches the signed digest value.

If the hash value matches the signed digest value, the validation module reads the unique identifiers for the hardware modules of the SoC at step 410. The hardware identifiers may be stored in a one-time programmable memory of the SoC so that they cannot be modified after creation. In this manner, the hardware identifiers cannot be changed to match that of security certificates intended for other devices. The validation module compares the hardware identifier(s) in the security certificate to the list of hardware identifiers stored by the SoC at step 412. The one-time-programmable memory of the SoC may include memory for storing a version number for the hardware identifiers. In such cases, the validation module will confirm at step 412 whether the hardware identifiers match as well as whether a version identifier included in the security certificate matches the version number on the SoC for the hardware identifiers. In this manner, the version number can be irreversibly programmed into the SoC so that security certificates issued for the hardware module under an older version will not be used.

At step 414, the validation module extracts a current time from a trusted source. In one embodiment, a trusted on-chip source is used but the validation module may alternately access off-chip resources to determine a current time. The validation module compares an expiration time indicated in the security certificate with the current time at step 416.

If the current time is within the expiration time of the certificate, the validation module compares the key that was used to sign the security certificate with the one or more security features indicated in the security certificate at step 420. The validation module confirms that the key is associated with a sufficient level of security to control the identified security feature(s). For example, if a key that signed the security certificate does not represent a sufficient level of security, the validation module ignores the security certificate for purposes of that security feature. This technique allows the validation module to confirm whether the signing level of the security certificate represents a high enough level of security for the feature being controlled. In this manner, some security features may only be enabled by certain keys, while other features may be enabled by other keys. Consider a relatively benign security feature that may be opened to end-users and a high-risk security feature that should only be accessible to developers. The validation module may permit the benign security feature to be accessible via a large number of keys associated with relatively low-levels of security. By contrast, the validation module may permit the high-risk feature to be accessed via a security certificate that has been signed with a key associated with a high-level of security only.

If the validation module determines that the key is associated with a sufficient level of security for a security feature, it applies the access control settings indicated in the security certificate for the security feature(s) at step 424. For any security features for which the key is not sufficient to control access, the validation module ignores the access control setting and proceeds to step 428. Step 424 can include controlling hardware and software security features provided by the hardware modules for the SoC. For example, an access control setting may specify that a corresponding security feature is to be enabled for the length of the current boot cycle. The security certificate may specify that the security feature is to be disabled for the length of the current boot cycle. The access control setting may specify that software is able to modify a setting for the security feature. For example, the setting may specify that software is able to enable a disabled feature or disable an enabled feature. The setting may specify that software can only enable or disable the security setting once (or another number of times) for the current boot cycle. For example, the setting may allow software to disable an enabled security feature, and then re-enable the security feature but not be able to again disable the security feature. Any number and types of controls for a security feature may be specified in the security certificate.

After executing the access control setting for the identified security features, the validation module determines whether additional security certificates remain to be verified. If there are additional security certificates, the validation module returns to step 404 to verify the security certificate using the hard coded key.

If the validation module fails to verify a security certificate at step 402, the security certificate is ignored. The validation module checks for additional security certificates at step 428 and continues the verification process until all security certificates have been evaluated. Similarly, if the digest value and calculated value do not match at step 408, if the hardware identifier does not match at step 412, or if the certificate has expired at step 416, the validation module continues to step 428 to check for additional security certificates. Once all security certificates have been evaluated, the validation module continues the boot process at step 430.

Although FIG. 3 describes operation by the validation module during the boot sequence for the SoC, security certificates can be used at other times in various implementations. For example, the SoC may permit security certificates to be loaded to the SoC during operation. A certificate may be provided by downloading from a trusted certificate provider or may be directly provided over JTAG or another mechanism. In one embodiment, the SoC may send a request for a security certificate to the trusted certificate provider. The request may include the key associated with the SoC as well as one or more hardware identifiers for the SoC. The trusted certificate provider can confirm that the certificate should be issued to the SoC, and in turn create a security certificate using the hardware identifiers of the SoC and the hard-coded key. The validation module can access the security certificate and then execute steps 404-428 as shown.

Figure 4:
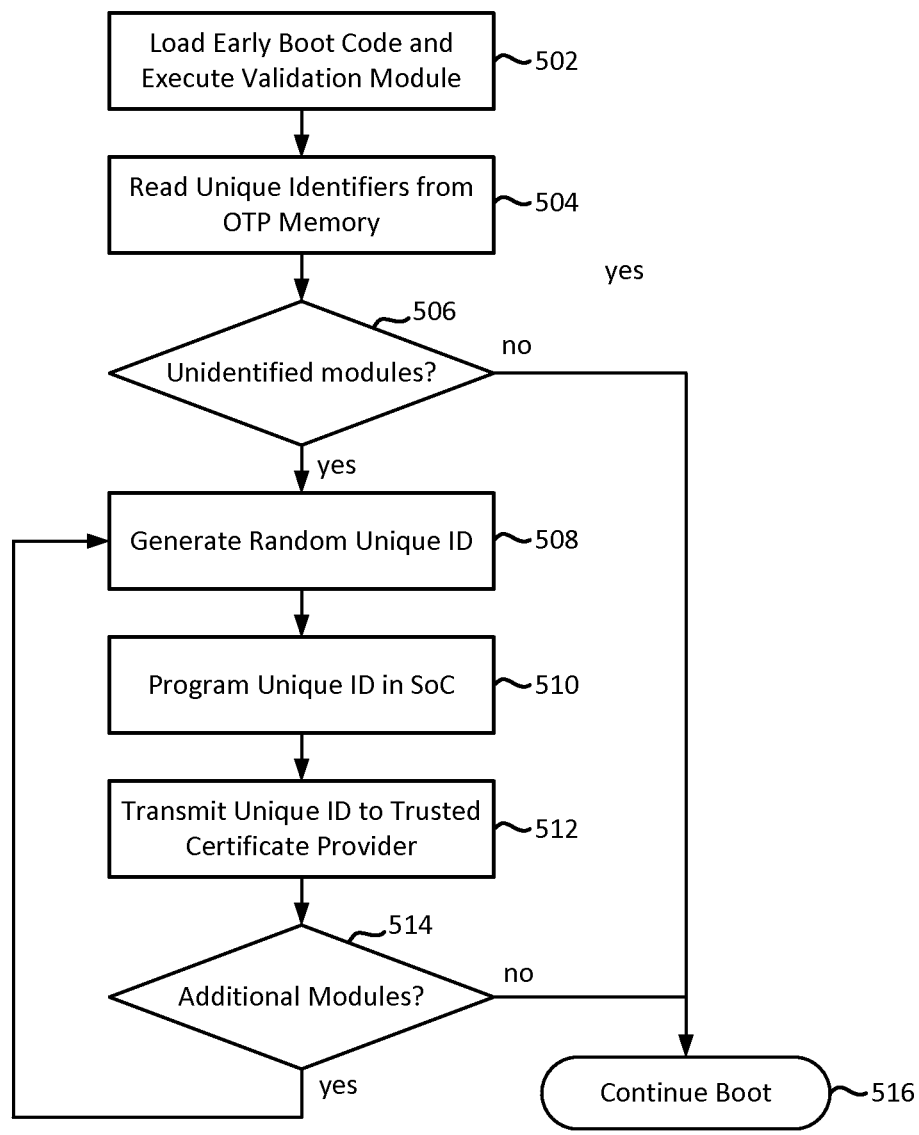
FIG. 4 is a flowchart describing a process for programming hardware identifiers for a SoC.

FIG. 4 is a flowchart of a process performed by a SoC in accordance with one embodiment to generate unique hardware identifiers for hardware modules. At step 502, the early boot code is loaded and the validation module is executed. At step 504, the validation module reads a list of hardware identifiers for the hardware modules of the SoC. At step 506, the validation module determines whether each of the chip's hardware modules have a unique hardware identifier in the list. The SoC may have unique identifiers for one or more hardware modules pre-defined in the SoC while other hardware modules may not have identifiers pre-defined.

If the validation module determines that the list does not include a unique identifier for one or more of the hardware modules, the validation module generates a unique ID for one of the hardware modules at step 508. The validation module uses a random number generator on board the SoC in one example. At step 510, the validation module irreversibly programs the unique hardware identifier into memory of the SoC. In one embodiment, the validation module programs a set of OTP bits pre-designated to hold the hardware identifier for the hardware module.

At step 512, the validation module transmits the unique hardware identifier to a trusted certificate provider. The certificate provider can then generate security certificates for the hardware module using the unique identifier. In one embodiment, the validation module does not transmit the unique identifier to a trusted certificate provider. The unique identifier can be provided to the provider in other ways or not provided at all. For example, a user can be provided with the unique identifier upon generation at step 508 and transmit the unique identifier to the certificate provider.

At step 514, the validation module determines whether additional hardware modules of the SoC are unidentified in memory of the SoC. If an additional hardware module exists, the validation module returns to step 508 to generate a unique hardware identifier for the hardware module. If the validation module determines that all hardware modules have been identified at step 514 or step 506, the boot sequence continues at step 516.

In one embodiment, the security certificates are used by validation module 228 to grant software access to the access control settings for select security features. For example, access enablement circuit may interact with data registers 234 which are programmable by software. Values can be programmed into data registers 234 that cause the access enablement circuit 230 to enable, disable, and/or lock security features on SoC 200. Validation module may utilize security certificates 240 to enable software to modify the contents of data registers 234, and thereby affect changes to the access control settings for a security feature. In one embodiment, validation module 228 grants security processor 218 access to program data registers 234 to make changes to the access control settings.

An access enablement table is provided that contains an implementation definition of the access enablement circuit for controlling the security features of a SoC. An access control setting for each individual security feature is provided in the table comprising one or more input parameters. The access enablement table provides a simple, understandable and centralized view of security control and access for the system. By way of example, the table may provide security specific controls for each security feature, including the ability to control a feature as always on, always off, programmable with default on and off, and lockable. For each security feature, the access enablement table defines an access control setting for the security feature based on the security state of the SoC.

A circuit design for the access enablement circuit is automatically generated from the access enablement table. Using an automated script-based technique, the access enablement table is parsed into the components for generating a hardware description language (HDL) representation of the access enablement circuit. This can including parsing the table into one or more ROM components and an output signal list for the access enablement circuit in one example. The results of parsing are used to automatically generate the HDL for the access enablement circuit. Each output signal and ROM can be instantiated, along with adding connecting logic for the components.

Figure 5:
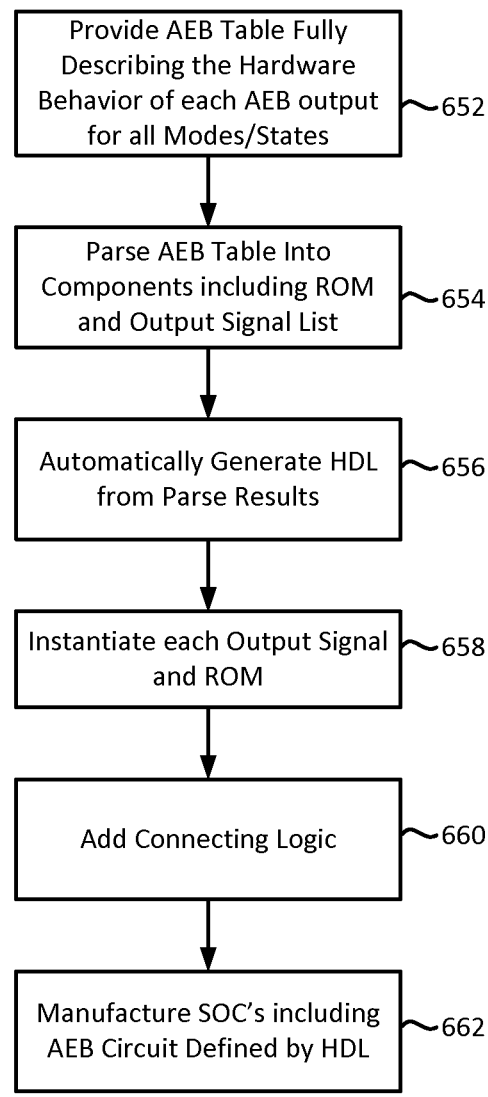
FIG. 5 is a flowchart describing a process for generating a SoC design including access enablement circuitry.

FIG. 5 is a flowchart describing a method of manufacturing a SoC including an access enablement circuit in accordance with an embodiment. At step 652, an access enablement table is accessed that fully describes the hardware behavior for the access enablement circuit. The AEB table includes entries for each output of the AEC, setting the behavior of each output for each mode and security state of the chip. At step 654, the AEB table is parsed using an automated script to generate the components for the AEC. The table is parsed into the components for an HDL description of the AEC. The components may include ROM's that define the output behaviors of the output signals of the AEC for controlling the security features of the chip. At step 656, an HDL description of the AEC circuit is generated. As steps 658 and 660 illustrate, generating the HDL description may include instantiate each output signal of the AEC, instantiating each ROM, and adding connecting logic to define how the ROM data is utilized to control the behavior of each output signal. At step 662, SoC's are manufactured using the generated HDL description of the AEC. The ROM based implementation permits changes to the ROM contents simply by altering the AEB table. This permits changes to the AEC design in subsequent silicon revisions without significant digital or physical design impacts.

FIG. 6 is a block diagram describing an example of an access enablement table according to one embodiment. The AEB table forms the complete basis for a hardware description (HDL) implementation of an access enablement circuit in one embodiment. The AEB table is provided as a spreadsheet in one example, containing the implementation definition for the security features of the SoC. Each security feature is set forth as a row in the spreadsheet under the "Output" heading. The complete access enablement definition for a security feature includes several parameters set forth as the columns in the spreadsheet. When combined, the features in the column define access control to the security feature in all implementation aspects.

In the specific example of FIG. 6, a set of seven exemplary security features are set forth. The security features include a "Clock" security feature which can be used to gate clocks or select signals for clock muxes to provide secured clock gating or switching. A "Reset" security feature can be used to either issue a reset or mask a reset issued by other less trusted entities. A "Debug" security feature controls access to on-chip debug circuits. An "I/O Pads" security feature controls access to I/O pads of the chip for enablement or configuration purposes. A "Bus Interface" security feature controls access to certain client on a given bus or an entire bus interface. A "DFT" security feature controls access to DFT features such as scan, MBIST, memory dump, scan dump, and boundary scan. The depicted security features are provided by way of example only. Different SoC implementations may include different security features than those depicted in FIG. 6.

A first column of the AEB table corresponds to a first security state of the chip as programmed in the security state memory 204. The first security state column sets forth the security behavior for each of the security features when the chip is in the first security state. In this example, the "Clock" security feature is set to HWNO. The HWNO access control setting indicates that the "Clock" security feature is hardware disabled when the chip is in the first security state. For example, the AEC generated from the table will generate an output in the first security state that disables or otherwise prevents access to clock gating and switching. The "Reset" security feature is set to HWYES. The HWYES access control setting indicates that for the first security state, the "Reset" feature or ability to issue a reset or mask a reset is always hardware-enabled. The control settings for the remaining security features for the first security state are set forth with either HWYES or HWNO designations.

A second column of the AEB table corresponds to a second security state of the chip. In the second security state, the "Clock" security feature is set to HWYES as earlier described. The "Reset," "Debug" and "Test Circuit" security features are each set to Y/SPWL. The "Y" access control setting designates that the security feature is enabled by default when in the second security state. The additional SPWL designation defines the security feature as "Security Processor Write Locked." In this manner, the AEB table sets forth that the security processor may disable the feature from its default enabled setting, and optionally also lock the feature from being enabled for the current boot cycle. The "I/O Pads," "Bus Interface," and "DFT" security features are each set to N/SPWL. The "N" access control setting sets forth that the security feature is disabled by default. The additional SPWL access control setting, in conjunction with the default "N" access control setting, sets forth that the security processor may enable the feature, and optionally also disable it again and lock it from being enabled again for the current boot cycle.

The access control setting for a security feature can also be based on the access control setting of one or more other security features. For example, it may be determined that for a certain combination of enabled security features, another security feature should have a particular setting. Accordingly, the entry for such a feature in a given security state may be defined by the access control settings for one or more other security settings in that security state.

In one example, the AEB table may include an additional column with an index list. The table entry for a feature can then be based on a logical combination of index lookups from other features in the table. Moreover, the table entry for a security feature may be based on state logic from any other location within the table. For example, the entry may be a logical combination of the outputs of other rows. In another example, the security feature entry may be a logical combination of the inputs for one or more other entries in the table. Such rows may be defined as custom rows. An equation can be defined for a row based on any input, or logic from another row.

The AEB table in FIG. 6 has several optional columns that permit further control over the security features of the SoC. The OTP column permits a particular security feature to have different behaviors or access control under the same security state. If a "1" is set forth in the column for a security feature, the security feature can be controlled by data from a one-time programmable (OTP) memory. In this manner, one or more OTP bits can be programmed after the chip is designed and manufactured to change the access control for a security feature when under a particular security state. For example, the "Clock" security feature may have a default access control of "HWNO" when the corresponding OTP bit is not programmed, for example binary "0." If the corresponding OTP bit is programmed, for example to binary "1," the AEC circuitry may permit access to the "Clock" security feature.

The REV_SEL column allows certain features to have an override for one or more revisions for the chip manufacture. For example, a new "test circuit" or other circuit may be provided in a chip as a prototype or otherwise as a completely untested component whose behavior cannot be guaranteed. The REV_SEL designation allows the feature to be bypassed for a first or subsequent silicon revision of the chip. For example, if the new circuit does not work or perform in a manner consistent with the SoC operation, the REV_SEL designation permits an override of the feature during the revision of the current revision and optionally subsequent revisions of the silicon. As earlier described, the table may be extended in other manners to take any input from the SoC.

Although not shown, the AEB table may include additional rows that are implemented as spares in the AEC implementation. In one example, an additional spare row can include the most commonly used ROM implementations. During a real silicon spin process, the spare rows can be connected to minimize design changes. Furthermore, this enables independent control over a security feature that may have not been enabled for control in an earlier silicon revision.

Figure 7:
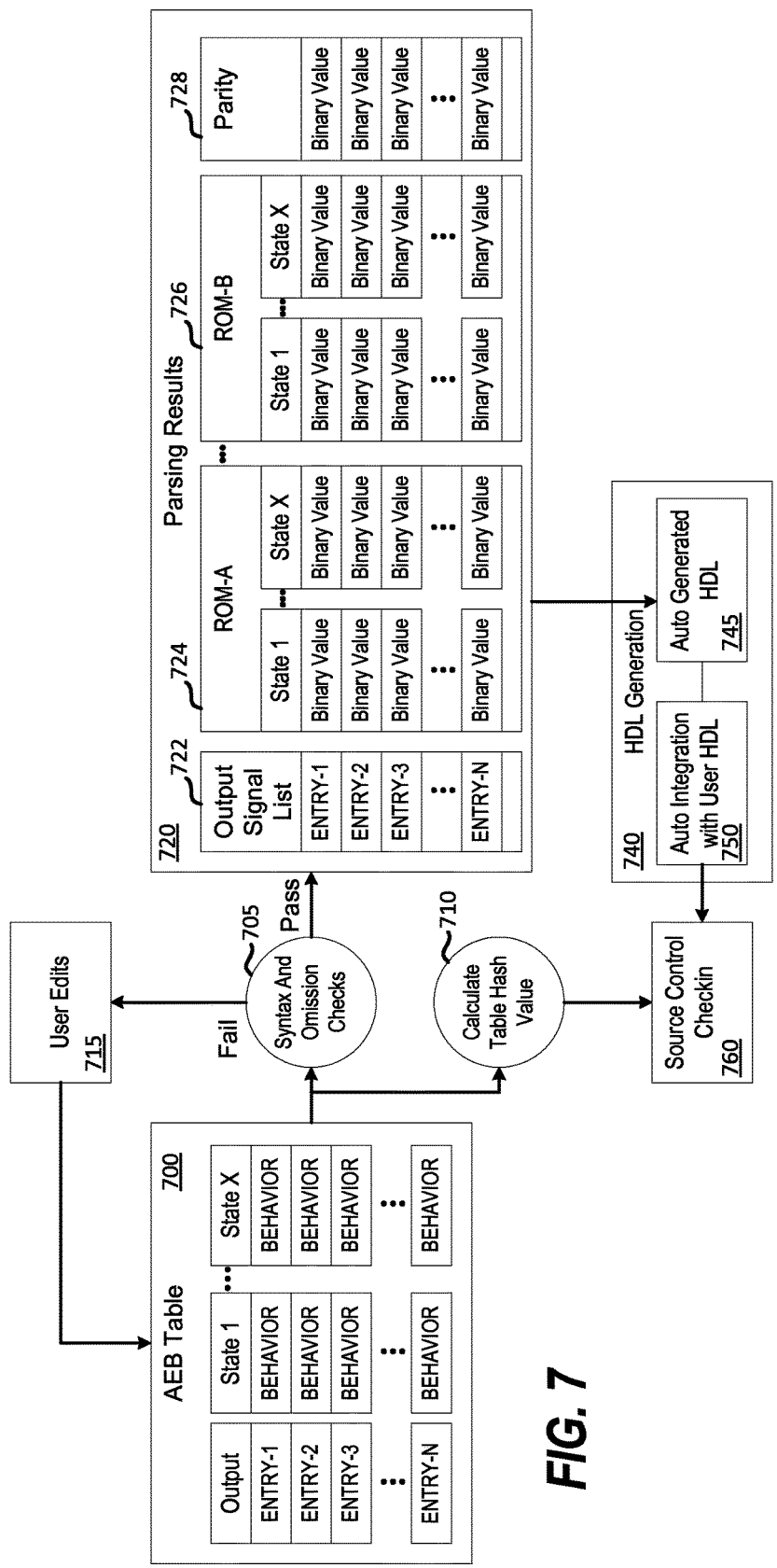
FIG. 7 is a block diagram depicting the generation of a SoC design having access enablement circuitry defined by an access enablement table.

FIG. 7 is a block diagram depicting the generation of a hardware description language (HDL) description for an access enablement circuit according to one embodiment. An access enablement table 700 is provided including a plurality of rows corresponding to a set of security features for a SoC, and a plurality of columns corresponding to a set of security states for the SoC. As described with respect to FIG. 6, the table can include additional columns corresponding to registers, programmable memory, or revision select signals for example. The table fully describes the hardware behavior of each output of an access enablement circuit for all modes and/or security-states of the SoC's operation. Each entry in the table corresponds to an output signal generated by the AEC. Each output signal will have a defined behavior based on the inputs for the entry, including for example, the security state of the chip, a software register interface, and/or one-time programmable memory bits as earlier described.

An automated script first parses the AEB table and checks for any syntax errors or omissions at step 705. If there is a syntax or omission failure, the table is rejected so that user edits and/or updates can be applied at step 715. Once the table passes the syntax and omission check, the automated script parses the AEB table to generate AEB parsing results 720. The parsing results 720 include an output signal list 722 including the outputs for access control of each security feature. The script extracts the behavior for each output signal for all modes and security states of operation. The script generates a description for one or more ROM's that define the output behaviors of the output signals. Each ROM is a two-dimensional array that defines the total set of behaviors for the AEC. As illustrated, one dimension of the ROM correlates to the number of security states of the SoC and the other dimension of the ROM correlates to the number of output signals for the AEC. Each entry in each ROM includes a binary value that encodes information relating to the output signal's behavior in a particular security state. The example of FIG. 7 includes two ROM's, ROM-A and ROM-B. When the output signals of an AEC are defined by multiple inputs with different behavioral impacts, more than one ROM can be generated, with each ROM defining an individual component of the signal's output behavior. In this particular example, a first ROM defines the default behavior of each output signal while a second ROM defines whether each output signal can be influenced by software modifiable registers. In FIG. 7, a set of ROM parity check values are also generated from the table. In parallel with generating the parsing results, the automated script calculates a hash value of the table binary. The table hash value is recorded at step 760. In one example, the hash value is recorded to provision revision control to make sure that which is fabricated from HDL is the same as the source AEB table.

After generating the AEB parsing results 720, the script automatically generates an HDL description for the AEC implementation. In one embodiment, the script instantiates each output signal and each ROM from the parsing results. The script also adds connection logic for combining inputs from the ROM(s), registers, OTP bits, etc. Optionally, the script can instantiate the ROM parity output from the parsing results to protect against silicon defects and/or silicon modification attacks (e.g., focused ion beam (FIB)). There are multiple possible HDL design topologies that may be generated. In some examples, the topology may leverage or otherwise use existing user-generated HDL. In such cases, the auto-generated HDL 745 is automatically integrated with the existing user-generated HDL at step 750. The combined HDL is then submitted for source control check-in at step 760.

Figure 8:
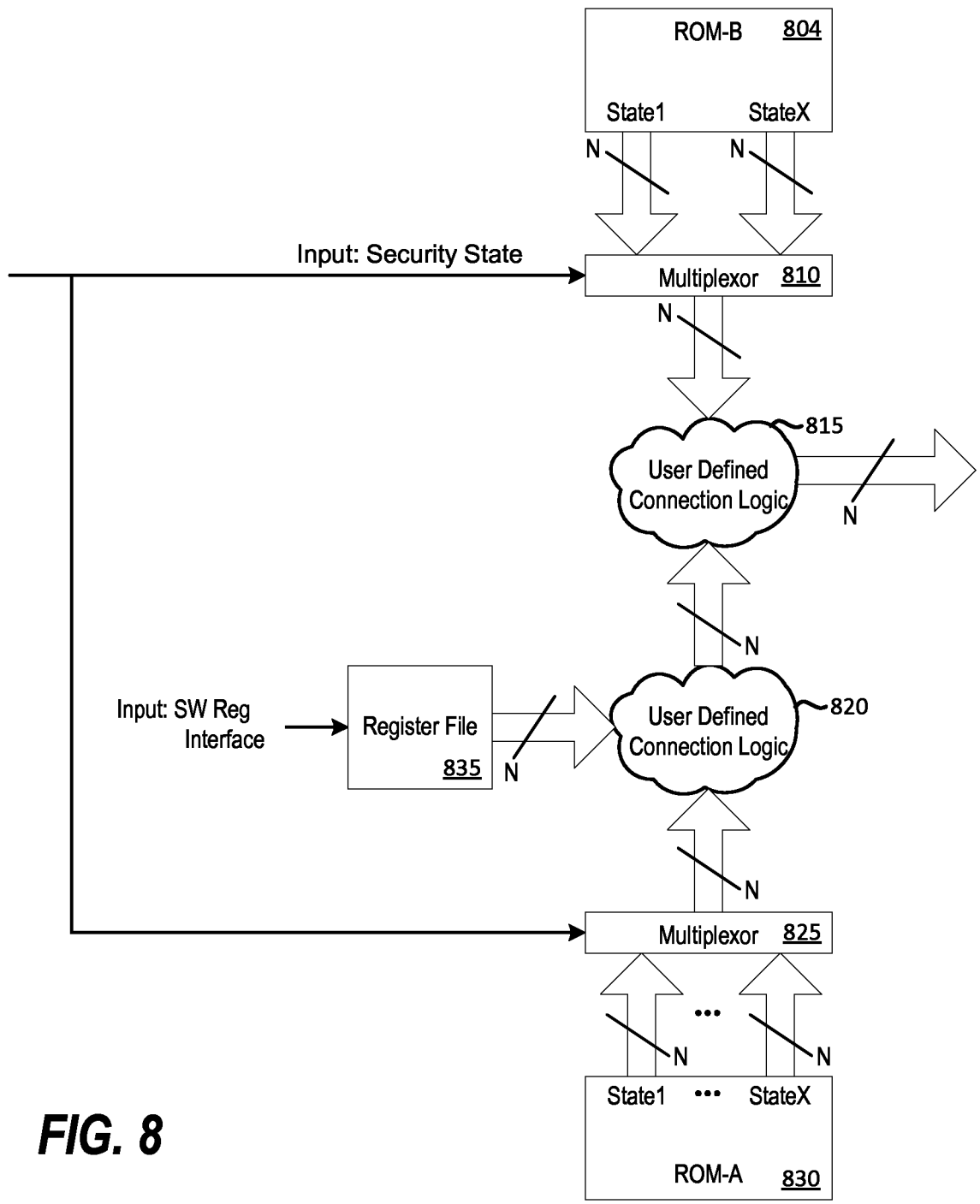
FIG. 8 is a block diagram depicting a SoC design including access enablement circuitry.

FIG. 8 is block diagram of an example of a circuit implementation in accordance with one embodiment. In this example, ROM-B 804 defines a default state of each output signal and ROM-A defines an influence of a set of software modifiable registers on each output signal. Such a ROM-based approach allows for late changes to the ROM contents via late changes to the AEB table. Because of the ROMs, the changes do not cause significant digital or physical design impact. The ROMs can be changed for subsequent silicon revisions using a single metal layer spin. In other ROM implementations, additional metal layers may be used.

For each security state, ROM-B generates an output for each security feature indicating the default state of the security feature, such as hardware-enabled, hardware-disabled, etc. In this example, ROM-B is a two-dimensional array with a first dimension equal to a number of security states (State1-StateX) and a second dimension equal to a number N of security features (N). Thus, there are N outputs for each security state. The outputs of ROM-B are communicated to a multiplexor 810 which receives as a selection input the active security state from the set of programmable fuses. The multiplexor selects a set of outputs from ROM-B based on the active security state. The multiplexor communicates with user-defined connection logic 815 to provide a set of outputs from ROM-B based on the active security state.

For each security state, ROM-A generates an output for each security feature indicating whether the security feature is modifiable by software. The outputs of ROM-A are communicated to a multiplexor 825 which receives the active security state as a selection input. The multiplexor selects and communicates to user-defined connection logic 820 a set of outputs from ROM-A based on the active security state. The connection logic 820 receives the output signals for the active security state and also a register file or other input from the set of software modifiable data registers. The register data includes an input for each security feature. Based on the input from multiplexor 825, connection logic 820 determines whether to use the register data. The connection logic chooses whether to use the register data for each security feature individually. The connection logic provides an output signal for each security feature based on the active security state. The user-defined connection logic may be unique for each output signal. For each output signal, the connection logic may provide a generic set of connection logic or custom connection logic for other output signals. Some output signals may include security sensitive custom connection logic, for example implementing voltage-attack-resistant (VAR) macros, and similar hardware to protect against security attacks.

Figure 9:
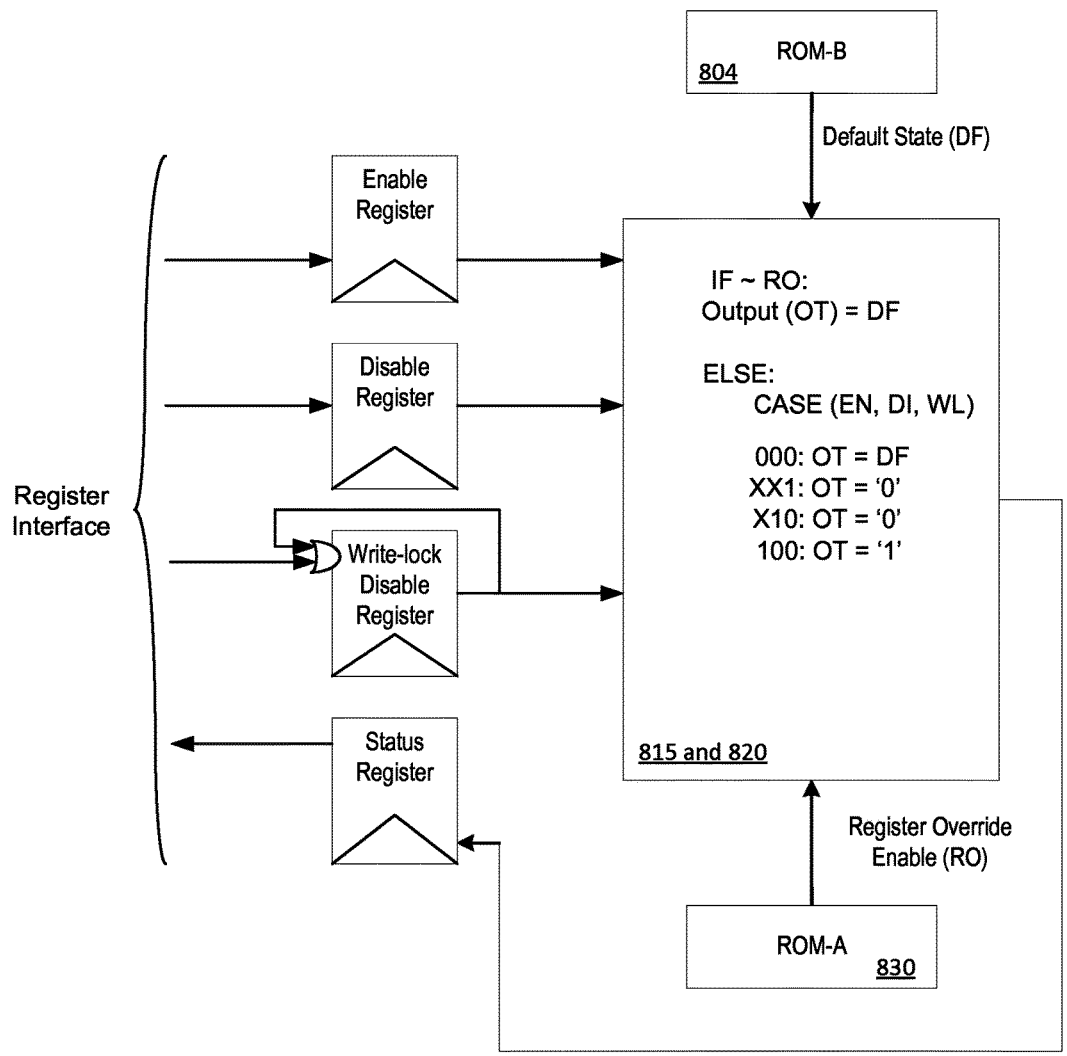
FIG. 9 is a block diagram depicting details of access enablement circuitry for an output signal.

FIG. 9 is a block diagram depicting connection logic 815 and 820 in one example. A portion of the connection logic for a single output of the access enablement circuit is depicted. The connection logic may be replicated "N" times to generate an output signal for each security feature or entry in the AEB table. In this example, register file 835 includes a set of three registers for each output signal. The registers include an "enable" (EN) register, a "disable" (DI) register, and a "write-lock disable" (WL) register. In this example, each register provides a single bit to the connection logic 820. Optionally, a read-only "status" register may be provided to feedback the state of the output signals for software checking.

ROM-B provides a default access control setting (DF) to the connection logic for the security feature. ROM-A provides a register override enable (RO) signal indicating whether the register data is to be used for the output signal. If the RO signal is asserted, the register data will override the DF setting. Otherwise, the register data will be ignored. In this example, the connection logic implements IF/ELSE logic based on the output of ROM-A. First, the connection logic determines whether the register override enable is provided from ROM-A for the security feature. If the RO signal is de-asserted, the connection logic sets the output signal (OT) to the default state DF. If the RO signal is asserted, the connection logic executes the ELSE statement including a set of case statements based on the enable register value, the disable register value, and the write-lock disable register value. In this case, if all three registers provide a binary '0,' the connection logic sets the output signal to the default state DF, either enabled or disabled. If the write-lock disable register provides a binary '1,' the connection logic sets the output signal to the '0,' indicating that the security feature is disabled. If the write-lock disable register provides a binary '0,' and the disable register provides a binary '1,' the connection logic sets the output signal to '0,' indicating that the security feature is disabled. If the write-lock disable and disable registers are both set to '0' and the enable register is set to '1,' the connection logic sets the output signal to '1' indicating that the security feature is enabled.

Although specific components and software modules are depicted, it will be apparent that numerous physical and software based configurations may be employed while remaining within the spirit of the present disclosure. Generally, software and program modules, managers and engines as described herein include routines, programs, components, data structures, and other types of structures that perform particular tasks or implement particular abstract data types. Hardware or combinations of hardware and software can be substituted for software modules as described herein. One or more embodiments of the present disclosure may include a variety of computer readable media. Computer readable media can be any available media that can be accessed by a computing device and includes both volatile and nonvolatile media, removable and non-removable media. By way of example, and not limitation, computer readable media may comprise computer readable storage media and communication media. Computer readable storage media includes volatile and nonvolatile, as well as removable and non-removable media implemented in any method or technology for storage of information such as computer readable instructions, data structures, program modules or other data. Computer readable storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the information and which can be accessed by a computing device. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A system-on-chip, comprising:
a first processor;
a plurality of hardware circuits implemented on a substrate, the plurality of hardware circuits including a plurality of security features;
a one-time-programmable memory containing a plurality of hardware identifiers to identify each of the plurality of hardware circuits; and
a memory including processor-readable instructions for programming the first processor to access a security certificate associated with a first security feature, the security certificate including a unique identifier associated with the first security feature and a list of one or more access control settings for the unique identifier, the first processor configured by the processor-readable instructions to verify the security certificate and determine whether the unique identifier matches the hardware identifier for one of the plurality of hardware circuits, the first processor configured by the processor-readable instructions to apply an access control setting from the list to initiate a one-time action in response to the security certificate being verified and the unique identifier matching the hardware identifier for one of the hardware circuits;
wherein the access control setting specifies that software initiates the one-time action to modify and lock the first security feature for the one of the hardware circuits, wherein the access control setting specifies that the one-time action is to be executed for a current boot cycle of the system-on-chip.

2. The system-on-chip of claim 1, wherein:
the security certificate includes a signature of a first digest value based on the unique identifier and the access control setting for the first security feature;
the first processor configured by the processor-readable instructions to verify the signature of the security certificate using a hard-coded public key;
the first processor configured by the processor-readable instructions to determine a second digest value based on the unique identifier and the access control setting of the first security feature; and
the first processor configured by the processor-readable instructions to control the first security feature in accordance with the security certificate in response to the security certificate being verified, the unique identifier matching the hardware identifier for one of the hardware circuits, and the first digest value matching the second digest value.

3. The system-on-chip of claim 2, wherein:
the security certificate specifies an expiration time; and
the first processor configured by the processor-readable instructions to determine a current time and control the security feature in accordance with the security certificate in response to the security certificate being verified, the unique identifier matching the hardware identifier for one of the hardware circuits, and the current time being before the expiration time.

4. The system-on-chip of claim 1, wherein:
the one-time-programmable memory contains a version number for each of the plurality of hardware circuits; and
the first processor configured by the processor-readable instructions to control the first security feature in accordance with the security certificate in response to the security certificate being verified, the unique identifier matching the hardware identifier for one of the hardware circuits and a version identifier in the security certificate matching the version number for the one of the hardware circuits.

5. The system-on-chip of claim 1, wherein:
the first processor configured by the processor-readable instructions to determine that the one-time-programmable memory does not contain a hardware identifier for a first hardware circuit of the system-on-chip; and
the first processor configured by the processor-readable instructions to generate a unique hardware identifier for the first hardware circuit and irreversibly program the unique hardware identifier for the first hardware circuit to the one-time-programmable memory.

6. The system-on-chip of claim 1, further comprising:
a centralized access enablement (AEB) circuit configured to control access to the plurality of security features, the centralized AEB circuit including a plurality of outputs, each output corresponding to a security feature of the hardware circuits and controlling access to the security feature, the AEB circuit configured to provide each output based on an output of a read-only-memory for an active security state.

7. The system-on-chip of claim 1, wherein:
the access control setting specifies that software initiates the one-time action to lock the first security feature as enabled for the current boot cycle.

8. The system-on-chip of claim 1, wherein:
the access control setting specifies that software may initiate the one-time action to lock the first security feature as disabled for the current boot cycle.

9. A method of operating a system-on-chip, comprising:
accessing a security certificate including a unique identifier associated with a first security feature of the system-on-chip and a list of one or more access control settings for the unique identifier;
verifying the security certificate using a key hard-coded in the system-on-chip;
reading from a one-time programmable memory of the system-on-chip a plurality of hardware identifiers that identify each of a plurality of hardware circuits of the system-on-chip;
determining that the unique identifier matches one of the hardware identifiers from the set of hardware identifiers; and
applying an access control setting from the list to initiate a one-time action in response to verifying the security certificate and determining that the unique identifier matches one of the hardware identifiers for one of the hardware circuits of the system-on-chip;
wherein the access control setting specifies that software initiates the one-time action to modify and lock the first security feature for the one of the hardware circuits, wherein the access control setting specifies that the one-time action is to be executed for a current boot cycle of the system-on-chip.

10. The method of claim 9, further comprising:
detecting that the plurality of hardware identifiers do not include a hardware identifier for a first hardware circuit of the system-on-chip;
generating a unique hardware identifier for the first hardware circuit in response to detecting that the plurality of hardware identifiers do not include the hardware identifier for the first hardware circuit; and
programming the unique hardware identifier for the first hardware circuit into a one-time-programmable memory of the system-on-chip.

11. The method of claim 10, wherein the security certificate includes a signature based on a first digest value, the first digest value based on the unique identifier and the access control setting for the security feature, the method further comprising:
calculating a second digest value by the system-on-chip using the unique identifier and the access control setting of the first security feature after verifying the security certificate; and
verifying that the first digest value matches the second digest value;
wherein applying the access control setting from the security certificate for the first security feature comprises applying the access control setting in response to verifying the security certificate, determining that the unique identifier matches one of the hardware identifiers, and determining that the first digest value matches the second digest value.

12. The method of claim 9, wherein:
the security certificate includes a version identifier associated with the unique identifier; reading the plurality of hardware identifiers includes reading a version number for each of the hardware identifiers;
the method further comprises determining that the version identifier associated with the unique identifier matches the version number associated with one of the hardware circuits; and
applying the access control setting from the security certificate for the first security feature comprises applying the access control setting in response to verifying the security certificate, determining that the unique identifier matches one of the hardware identifiers and determining that the version identifier associated with the unique identifier matches the version number associated with one of the hardware circuits.

13. The method of claim 9, further comprising:
comparing a set of security features provided by the system-on-chip with a set of security certificates stored by the system-on-chip; and
for any of the security features for which the set of security certificates do not specify an access control setting, disabling the security feature for a current boot cycle of the system-on-chip.

14. The method of claim 9, further comprising:
determining a current time from a trusted time source of the system-on-chip; and
determining that the current time is before an expiration time specified in the security certificate;
wherein applying the access control setting comprises applying the access control setting in response to verifying the security certificate, determining that the unique identifier matches one of the hardware identifiers and determining that the current time is before the expiration time of the security certificate.

15. A computer readable storage device having computer readable instructions for programming a processor to perform a method comprising:
accessing a security certificate including a unique identifier associated with a first security feature of a system-on-chip and a list of one or more access control settings for the unique identifier;
verifying the security certificate using a key hard-coded in the system-on-chip;
reading from a one-time programmable memory of the system-on-chip a plurality of hardware identifiers that identify each of a plurality of hardware circuits of the system-on-chip;
determining whether the unique identifier matches one of the hardware identifiers from the plurality of hardware identifiers; and
applying an access control setting from the list to initiate a one-time action in response to verifying the security certificate and determining that the unique identifier matches one of the hardware identifiers for one of the hardware circuits of the system-on-chip;
wherein the access control setting specifies that software initiates the one-time action to modify and lock the first security feature for the one of the hardware circuits, wherein the access control setting specifies that the one-time action is to be executed for a current boot cycle of the system-on-chip.

16. The computer readable storage device of claim 15, wherein the method further comprises:
detecting that the plurality of hardware identifiers do not include a hardware identifier for a first hardware circuit of the system-on-chip;
generating a unique hardware identifier for the first hardware circuit in response to detecting that the plurality of hardware identifiers does not include the hardware identifier for the first hardware circuit; and programming the unique hardware identifier for the first hardware circuit into a one-time-programmable memory of the system-on-chip.

17. The computer readable storage device of claim 16, wherein the security certificate includes a signature based on a first digest value, the first digest value based on the unique identifier and the access control setting for the security feature, the method further comprising:
- calculating a second digest value by the system-on-chip using the unique identifier and the access control setting of the first security feature after verifying the security certificate; and
- verifying whether the first digest value matches the second digest value;
- wherein applying the access control setting from the security certificate for the first security feature comprises applying the access control setting in response to verifying the security certificate, determining that the unique identifier matches one of the hardware identifiers, and determining that the first digest value matches the second digest value.

18. The computer readable storage device of claim 15, wherein:
- the security certificate includes a version identifier associated with the unique identifier; reading the plurality of hardware identifiers includes reading a version number for each of the hardware identifiers;
- the method further comprises determining that the version identifier associated with the unique identifier matches the version number associated with one of the hardware circuits; and
- applying the access control setting from the security certificate for the first security feature comprises applying the access control setting in response to verifying the security certificate, determining that the unique identifier matches one of the hardware identifiers, and determining that the version identifier associated with the unique identifier matches the version number associated with one of the hardware circuits.

19. The computer readable storage device of claim 15, wherein the method further comprises:
- comparing a set of security features provided by the system-on-chip with a set of security certificates stored by the system-on-chip; and
- for any security feature of the set for which the set of security certificates do not specify an access control setting, disabling the security feature for a current boot cycle of the system-on-chip.

20. The computer readable storage device of claim 15, wherein the method further comprises:
- determining a current time from a trusted time source of the system-on-chip; and
- determining that the current time is before an expiration time specified in the security certificate;
- wherein applying the access control setting comprises applying the access control setting in response to verifying the security certificate, determining that the unique identifier matches one of the hardware identifiers, and determining that the current time is before the expiration time of the security certificate.

* * * * *